US000001343H

United States Statutory Invention Registration [19]

[11] Reg. Number: H1343

[43] Published: Aug. 2, 1994

Saitou et al.

[54] DIRECT POSITIVE SILVER HALIDE EMULSION AND A COLOR DIFFUSION TRANSFER PHOTOGRAPHIC FILM UNIT HAVING THE EMULSION

[75] Inventors: Mitsuo Saitou; Katsumi Hirano; Ashita Murai; Seiji Akiyama, all of Kanagawa, Japan

[73] Assignee: Fuji Photo Film Co., Ltd., Kanagawa, Japan

[21] Appl. No.: 982,441

[22] Filed: Nov. 27, 1992

[30] Foreign Application Priority Data

Nov. 27, 1991 [JP] Japan ..... 3-312669
May 28, 1992 [JP] Japan ..... 4-136713

[51] Int. Cl.[5] ..... G03C 1/005
[52] U.S. Cl. ..... 430/567; 430/569
[58] Field of Search ..... 430/567, 569

[56] References Cited

U.S. PATENT DOCUMENTS 4,879,208 11/1989 Urabe ..... 430/567
4,945,037 7/1990 Saitou ..... 430/567
5,155,017 10/1992 Sato et al. ..... 430/569

FOREIGN PATENT DOCUMENTS 323215 7/1989 European Pat. Off. ..... 430/569

*Primary Examiner*—Robert L. Stoll
*Assistant Examiner*—Joseph D. Anthony
*Attorney, Agent, or Firm*—Sughrue, Mion, Zinn, MacPeak & Seas

[57] ABSTRACT

There is disclosed a novel direct positive silver halide emulsion and a color diffusion transfer photographic film unit in which the above emulsion is used and which provides a high sensitivity and a low minimum density. The direct positive silver halide emulsion contains a core/shell type grain in which 60% or more of the projected area of all grains is shared by a monodispersed parallel twin crystal-containing type tabular grain having an aspect ratio of 1.5 or more, wherein the shell of the core/sell grain is formed by adding a silver salt in which at least 30 mole % of the silver salt is a non-twin crystal silver halide fine grain emulsion having an average grain size of 0.12 μm or less.

11 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

DIRECT POSITIVE SILVER HALIDE EMULSION AND A COLOR DIFFUSION TRANSFER PHOTOGRAPHIC FILM UNIT HAVING THE EMULSION

FIELD OF THE INVENTION

The present invention relates to a direct positive silver halide emulsion and a color diffusion transfer photographic film unit in which the emulsion is used.

BACKGROUND OF THE INVENTION

In general, a direct positive silver halide emulsion is prepared by mixing a water soluble silver salt and a water soluble halide in a gelatin aqueous solution to form a silver halide grain (a core grain) and precipitating silver halide for forming a shell after subjecting the core grain to a chemical sensitization, followed by carrying out a desalting and a chemical sensitization according to necessity. In such a preparation, a parallel twin crystal-containing type tabular core/shell type direct positive silver halide emulsion is preferred in order to obtain high sensitivity.

Where a parallel twin crystal-containing type tabular silver halide emulsion is used for a core/shell type direct positive silver halide emulsion in a color diffusion transfer photographic film unit, the light-sensitive layer of a light-sensitive material can be made thinner. Because of this, the sharpness of the light-sensitive layer itself and the sharpness of the image transferred by diffusion can be improved. Further, a greater amount of a sensitizing dye can be adsorbed thereon since the surface/volume ratio thereof is large compared with a regular crystal grain, and therefore the sensitivity in color sensitization is improved. Because of this, graininess is improved as well. Accordingly, a color diffusion transfer photographic film unit can have high sensitivity and high image quality.

Meanwhile, in the case of a parallel twin crystal-containing type tabular core/shell direct positive silver halide emulsion, where a core grain is chemically sensitized and subsequently a silver salt solution and a halide solution are added at a low pBr, there has been the problem that the shell is not uniformly formed between the grains and the grain size distribution is expanded.

A parallel twin crystal-containing type tabular core/shell type direct positive silver halide emulsion is described in U.S. Pat. Nos. 4,395,478 and 4,504,570, and JP-A-1-297649 (the term "JP-A" as used herein means an unexamined published Japanese patent application) and JP-A-1-158429. In these cases, shell formation after chemically sensitizing a core grain is insufficiently even. Shell formation by adding a fine grain for the purpose of obtaining an even shell is disclosed in JP-A-1-183417 (U.S. Pat. No. 4,879,208). In this case, the evenness of the shell is insufficient and prevention of contamination by a multiple twin crystal grain was not investigated. In order to solve the problem accompanying the addition of a fine grain, a technique using a mixer and a protective colloid is disclosed in the above patent. However, the effects thereof are insufficient and in addition, the technique used is entirely different from the technique of the present invention.

Uneven shell formation in a core/shell type direct positive silver halide emulsion results in insufficient covering of the surface of the core grain. On the other hand, in the case of forming a shell by adding a fine grain for the purpose of achieving an even shell formation, while even shell formation is partially achieved, grains having therein no light-sensitive nucleus coexist, to which the fine grains themselves are grown. Thus, in either case, a low minimum density by reversal development is not achieved and particularly it is no longer practical for use in a diffusion transfer light-sensitive unit. Accordingly, the compatibility of the two is a problem that needs to be solved.

SUMMARY OF THE INVENTION

The object of the present invention is to provide a monodispersed core/shell type direct positive silver halide emulsion in which shell formation can be uniformly made among the grains after the tabular core grains are subjected to a chemical sensitization and which has a small coefficient of variation in grain size distribution and a high aspect ratio, and to provide a color diffusion transfer light-sensitive unit in which the above emulsion is used and which provides a high sensitivity and a low minimum density.

The above object of the present invention has been achieved by providing a core/shell type direct positive silver halide emulsion and a color diffusion transfer photographic film unit in which the emulsion is used, which is described in the following items (1) to (3):

(1) a direct positive silver halide emulsion containing a core/shell type grain in which 60% or more of the projected area of all grains is shared by monodispersed parallel twin crystal-containing type tabular grains having an aspect ratio of 1.5 or more, wherein the shell of the core/shell grain is formed by adding a silver salt in which at least 30 mole % of the silver salt is a non-twin crystal silver halide fine grain emulsion having an average grain size of 0.12 μm or less;

(2) in the direct positive silver halide emulsion described in item (1) above, the pBr is 2.7 or less when forming the shell; and (3) a color diffusion transfer photographic film unit comprising:

1) a light-sensitive sheet comprising a transparent support, an image receiving layer, a white reflection layer, a light shielding layer, and at least one silver halide emulsion layer combined with at least one dye image-forming material,
2) a transparent cover sheet comprising at least a neutralization layer and a neutralization timing layer on a transparent support, and
3) a light-shielding alkali treating-composition capable of spreading between the light-sensitive sheet and transparent cover sheet, wherein one or more of the at least one silver halide emulsion layers contains the direct positive silver halide emulsion described in item (1) above.

DETAILED DESCRIPTION OF THE INVENTION

The present invention will be explained below in further detail.

A parallel twin crystal-containing type tabular grain is defined by a tabular grain having two or more parallel twin planes and the details can be found in Photographische Korrespondenz, by Klein, Metz and Moiser, vol. 99, pp. 99 to 102 (1963) and vol. 100, pp. 57 to 71 (1964). In the present invention, 60% or more, preferably 80% or more and more preferably 95% or more of the projected area of all of the silver halide grains is shared by grains having two or three twin planes, preferably two twin planes. Further, the aspect ratio of the tabular core/shell grain is 1.5 or more, preferably 2 or more and more preferably 3 to 20, wherein the aspect ratio is defined by the ratio of diameter/thickness of a tabular grain; the diameter is defined by a diameter of a circle having the same area as a projected area of a grain, which is determined by observing the grain with an electron microscope; and the thickness is defined by the distance between the primary planes of the tabular grain. The grain size distribution of the tabular core/-shell type grain is monodispersed, wherein the term "monodispersed" is defined by a coefficient of variation of preferably 35% or less, more preferably 25% or less and further more preferably 15% or less, in which the coefficient of variation is defined by the value obtained by dividing the fluctuation (the standard deviation) of a grain size corresponding to a diameter of the circle to which a projected area of a grain is converted with the average grain size.

In order to prepare the tabular core/shell emulsion grain having two to three, preferably two parallel twin planes, the tabular grain having the above characteristic, which is used as a core grain, may be chemically ripened and evenly provided with a shell. The method of preparing the tabular core grain having the above characteristic is described in JP-A-63-151618 and JP-A-2-838. When the above tabular grain is ripened using $NH_3$ in preparing it, the grain can be ripened at a pH value of the emulsion lowered to 5 or less, preferably 4 or less after the above ripening to control the reduction condition of the grain.

A preferred range of a projected diameter of the above core grain is 0.18 to 6 μm, more preferably 0.3 to 3 μm. A preferred halogen composition of the core grain is AgBrClI, in which the $I^-$ content is preferably 20 mole % or less, more preferably 5 mole % or less and further more preferably 1 mole % or less, and the Br. content is preferably 80 mole % or more, more preferably 90 mole % or more and further more preferably 97 mole % or more.

In the present invention, the above core emulsion grain can be chemically sensitized with a conventional chemical sensitizer (that is, there can be used singly or in combination, the sulfur, selenium, tellurium, gold and group eight noble metal compounds, and a phosphorus compound, and there can be used preferably the gold, sulfur and selenium compounds in combination). With respect to a pBr value in the above chemical sensitization, a preferred value selected from the range of 3 or less, preferably 2 or less can be used, wherein pBr is defined as $-\log[Br^-$ mole concentration]. The preferred range of the ripening temperature is 50° to 80° C, more preferably 60° to 75° C. The details of the above chemical ripening can be found in the descriptions in the publications described later.

A shell formation is carried out following the chemical sensitization. When this shell formation is carried out by adding a silver salt solution and a halide solution at a low pBr, the size distribution of the grain finally obtained is expanded. In the present invention, this shell formation is carried out by adding a substantially non-twin crystal fine grain emulsion.

In the present invention, the non-twin crystal silver halide fine grain is defined by a fine grain emulsion having substantially no multiplex twin plane and defined by a number ratio of a grain having a multiplex twin plane of 5% or less, preferably 1% or less and more preferably 0.1% or less. The details of the multiplex twin crystal grain structure can be found in the descriptions in Basic Photographic Process of Silver Halide, edited by H. Frieser et al, Chapter 3, and Akademische Verlagssellschaft Frankfurtam Main (1968). The preparation and other details can be found in the descriptions of Japanese Patent Application 2-142635. It is known that the fine grains can usually be formed by adding a silver salt solution and a halide solution for a short time under conditions of as low a silver halide solubility as possible (no silver halide solvent is used; the temperature is as low as possible and the pAg region of the lowest solubility is selected from a silver halide solubility curve) and under conditions of as good stirring efficiency as possible. However, of the above conditions, the ones other than good stirring efficiency contribute to increasing the yield probability of the multiplex twin crystal grain. Accordingly, an effective means for decreasing the yield probability of the multiplex twin crystal grain is the method in which low molecular weight gelatin is used in a high concentration at the nucleus formation stage of the fine grain, wherein the low molecular weight gelatin is defined by gelatin having a molecular weight of preferably 5,000 to 60,000, more preferably 10,000 to 30,000; and further, the high concentration means 1 to 15% by weight, more preferably 3 to 8% by weight. The non-twin crystal fine grain emulsion has an average grain size of 0.12 μm or less, preferably 0.1 to 0.01 μm and more preferably 0.06 to 0.015 μm. A silver salt solution and a halide solution can be added by a double jet method at the same time as the addition of the fine grain emulsion, and the addition mole % of the fine grain emulsion is 30% or more, preferably 70% or more and more preferably 100%. The pBr value during formation of the shell is preferably 2.7 or less, more preferably 2 to 0.4 and further more preferably 1.5 to 0.6.

Thus, a monodispersed tabular core/shell emulsion grain with a high aspect ratio can be prepared. In this case, the grain grows in an edge direction. The thickness of the tabular grain can be controlled by adding a silver salt solution after the growth of the grain to adjust the pBr preferably to 1.8 or more, more preferably 2 to 4 and adding a silver salt solution and a halide solution in the above condition. In this case, the grain grows mainly in a thickness direction. With respect to the growth width in the edge direction and the growth width in the thickness direction, the optimum widths can be selected according to the respective purposes. When adjusting the thickness is not necessary, the latter process can be omitted.

The fine grain emulsion can be added continuously, intermittently or at one time. The addition is controlled so that the solubility in the system is not increased more than the solubility of the fine grains added. A preferred method can be selected and used according to the respective purposes.

The range of the preferred halogen composition in the shell is the same as that of the above core grain.

The mole ratio of a core portion/a shell portion in the core/shell grain is preferably 1/30 to 5/1, more preferably 1/20 to 1/1 and further more preferably 1/10 to 1/2. The core/shell grain can be used without subjecting the surface thereof to a chemical sensitization but it is preferably subjected to a chemical sensitization since a positive image having a high maximum density can be obtained. The chemical sensitization of the surface is described in JP-A-57-13641 and the publications mentioned later.

The pH value of an emulsion in the core grain formation and shell formation is usually 1.8 to 11, preferably 2 to 9 and more preferably 3 to 7. The most preferred value can be selected and used according to the respective conditions.

A silver halide solvent can be used for the purposes of accelerating the growth of the core/shell grain at the crystal growth step and making the chemical sensitization effective in the chemical sensitization. Examples of the silver halide solvents frequently used include a thiocyanic acid salt, ammonia, thioethers, thioureas, and an anti-foggant (preferably tetrazaindenes), preferably thioethers and thioureas. The details of the silver halide solvents can be found in the publications mentioned later.

Where the core/shell emulsion is spectrally sensitized, the addition proportion of a spectral sensitizing dye in the core/shell emulsion is usually 10 to 130%, preferably 30 to 100% and more preferably 50 to 100% based on a saturated adsorption amount.

The tabular core/shell type direct positive emulsion of the present invention thus prepared can be used for at least one light-sensitive layer in all known direct positive photographic materials. Also, it can be used as a mixture with the known core/shell emulsions. The known direct positive photographic materials are described in the following publications: Photographic Science and Engineering, vol. 20, pp. 155 (1976); JP-B-46-16356 (the term "JP-B" as used herein means an examined Japanese patent publication}; U.S. Pat. Nos. 3,362,819, 3,730,718, 4,499,174, 3,227,550, 4,401,746, and 4,606,992, JP-A-1-297649, JP-A-1-158429 and JP-A-63-226649; and Research Disclosure vol. 176 (item 17643, December 1978), and vol. 307 (item 307105, November 1989).

There are no specific limitations on the additives which can be added at the steps of grain formation through coating in preparing the silver halide emulsion of the present invention. The additives which can be added include a silver halide solvent (also referred to as a ripening accelerator), a doping agent to a silver halide grain [a group eight noble metal compound, other metal compounds (gold, iron, lead, cadmium and others), a chalcogen compound, an SCN compound, and others], a dispersant, an anti-foggant, a stabilizer, a sensitizing dye (for blue, green, red, infrared, pan-chromatic, orthochromatic, and others), a supersensitizer, a nucleus-forming agent, a chemical sensitizer (a chemical sensitizer used singly or in combination, such as the sulfur, selenium, tellurium, gold and group eight noble metal compounds, and a phosphorus compound, most preferably the chemical sensitizer consisting of a combination of the gold, sulfur, selenium and tellurium compounds, and a reduction sensitizer such as stannous chloride, thiourea dioxide, polyamine, and an amine borane type compound), a surface active agent (a defoaming agent and others), an emulsion precipitating agent, a soluble silver salt (AgSCN, silver phosphate, silver acetate, and others), a latent image stabilizer, an anti-pressure desensitizer, a thickener, a hardener, a developing agent (a hydroquinone type compound and others), a development modifier, a dye image-forming agent, a direct positive color photographic additive, and others. Specific compounds and application methods thereof can be found in the following publications.

In addition to the above, the present invention can be used in combination with any of the publicly known techniques. These can be found in the following publications: Research Disclosure, vol. 151, No. 15162, pp. 76 to 78, vol. 176 (item 17643, December 1978), and vol. 307 (item 307105, November 1989); Photographic Emulsion Chemistry written by Duffin, Focal Press, New York (1966); Stabilization of Photographic Silver Halide Emulsion written by E. J. Birr, Focal Press, London (1974); The Theory of Photographic Process edited by T. H. James, the fourth edition, Macmillan, New York (1977); Chimie et Physique Photographiques written by P. Glafkides, the fifth edition; Edition de I', Usine Nouvelle, Paris (1987) and the second edition, Paul, Montel, Paris (1957), U.S. Pat. Nos. 3,206,313, 3,317,322, 3,761,266, 3,761,276, 3,850,637, 3,923,513, 4,035,185, 4,184,878, 4,395,478, and 4,504,570; and JP-A-57-136641, JP-A-61-3137, JP-A-1-297649, JP-A-1-158429, JP-A-63-151618, and Japanese Patent Application 62-208241.

In the present invention, spectral sensitization can be carried out with a sensitizing dye. There are available as the sensitizing dye which can be used, a cyanine dye, a merocyanine dye, a composite cyanine dye, a composite merocyanine dye, a holopolar cyanine dye, a hemicyanine dye, a styryl dye, and a hemioxonol dye. As specific examples, there can be mentioned the sensitizing dyes described in U.S. Pat. No. 4,617,257, JP-A-59-180550, JP-A-60-140335, and JP-A-61-160739, RD 17029 (1978) pp. 12 to 13, and RD 17643 (1978) pp. 23.

These sensitizing dyes may be used singly or in combination thereof. A combination of the sensitizing dyes is frequently used particularly for the purpose of supersensitization. Typical examples thereof are described in U.S. Pat. Nos. 2,688,545, 2,977,229, 3,397,060, 3,522,052, 3,527,641, 3,617,293, 3,628,964, 3,666,480, 3,672,898, 3,679,428, 3,703,377, 3,769,301, 3,814,609, 3,837,862, and 4,026,707, British Patents 1,344,281 and 1,507,803, JP-B-43-4936 and JP-B-53-12375, and JP-A-52-110618 and JP-A-52-109925.

In addition to the sensitizing dyes, there may be incorporated into an emulsion, dyes having no spectral sensitization action by themselves or materials which do not substantially absorb visible rays and show a supersensitization (for example, the compounds described in U.S. Pat. Nos. 3,615,613, 3,615,641, 3,617,295, 3,635,721, 2,933,390, and 3,743,510, and JP-A-63-23145).

The timing for adding a sensitizing dye to an emulsion may be at any step in the preparation of the emulsion, which is known as useful. Most usually, the sensitizing dye is added during the period of from the completion of the chemical sensitization to before coating. It can be added at the same time as the addition of a chemical sensitizer and a spectral sensitization can be carried out at the same time as the chemical sensitization, as described in U.S. Pat. Nos. 3,628,969 and 4,225,666; it can also be added prior to the chemical sensitization as described in JP-A-58-113928; or it can be added before the completion of precipitating the silver halide grains to start the spectral sensitization. Furthermore, the above compounds can be divided and added; that is, it is possible to add a part of these compounds prior to a chemical sensitization and to add the remainder after the completion of the chemical sensitization, as taught in U.S. Pat. No. 4,225,666. Also, it may be added at any stage in the formation of a sliver halide grain including the method disclosed in U.S. Pat. No. 4,183,756.

The addition amount of the sensitizing dye is $10^{-8}$ to $10^{-2}$ mole per mole of silver halide, and in the case of a preferred silver halide grain size of 0.2 to 1.2 $\mu$m, $5\times10^{-5}$ to $2\times10^{-3}$ mole per mole of silver halide is more effective.

The constitutional elements of the color diffusion transfer photographic film unit of the present invention are explained below in order.

I. Light-sensitive sheet

A) Support

Any type of support can be used for a support for the light-sensitive sheet in the present invention as long as it is a transparent flat support usually used for a photographic light-sensitive material. There can be used cellulose acetate, polystyrene, polyethylene terephthalate, and polycarbonate, and a subbing layer is preferably provided thereon. The support usually contains a trace amount of a dye or a pigment such as titanium oxide in order to prevent a light piping.

The thickness of the support is 50 to 350 μm, preferably 70 to 210 μm, and more preferably 80 to 150 μm.

A layer for adjusting curl balance or an oxygen shielding layer described in JP-A-56-78833 can be provided on the back side of the support according to necessity.

B) Image receiving layer

The dye image receiving layer used in the present invention comprises a mordant contained in gelatin. This layer may be a single layer or a multilayer constitution in which the mordants each having a different mordant power are provided one above the other. This is described in JP-A-61-252551. A polymer mordant is preferred as the mordant.

The polymer mordant is a polymer having a secondary or tertiary amino group, a polymer having a nitrogen-containing heterocyclic ring portion, and a polymer containing a quaternary cation. The polymer mordant has a molecular weight of 5,000 or more, particularly preferably 10,000 or more.

The coated amount of the mordant is generally 0.5 to 10 g/m$^2$, preferably 1.0 to 5.0 g/m$^2$, and particularly preferably 2 to 4 g/m$^2$.

The hydrophilic colloids used for an image receiving layer are gelatin, polyvinyl alcohol, polyacrylamide, and polyvinyl pyrrolidone, and gelatin is preferred.

There can be incorporated into the image receiving layer, the anti-fading agents described in JP-B-62-30620 and JP-B-62-30621 and JP-A-62-215272.

C) White reflection layer

A white reflection layer constituting a white background of a dye image usually contains a white pigment and a hydrophilic binder.

There can be used as the white pigment for the white reflection layer, barium sulfate, zinc oxide, barium stearate, silver flake, silicates, alumina, zirconium oxide, zirconium sodium sulfate, kaolin, mica, and titanium dioxide. Further, a non-layer forming polymer grain consisting of styrene can also be used. These may be used singly or as a mixture thereof in the range in which a desired reflection rate can be obtained.

A particularly useful white pigment is titanium dioxide.

The whiteness degree of the white reflection layer changes with the kind of pigment, mixed ratio of pigment and binder, and coated amount of the pigment, and a light reflection rate is preferably 70% or more. In general, the whiteness degree is improved as the coated amount of the pigment increases. When an image-forming dye is diffused through this layer, the pigment prevents the diffusion of the dye and therefore a suitable coated amount is preferably provided.

Titanium dioxide is coated in an amount of 5 to 40 g/m$^2$, preferably 10 to 25 g/m$^2$ so that the white reflection layer has preferably a light reflection rate of 78 to 85% at a wavelength of 540 nm.

Titanium dioxide can be used selecting from various brands commercially available. Of them, particularly rutile type titanium dioxide is preferably used.

A lot of the commercially available titanium dioxides are subjected to a surface treatment with alumina, silica and zinc oxide, and the surface treatment proportion is desirably 5% or more in order to obtain a high reflection degree. There are commercially available titanium dioxides, for example, the compounds described in Research Disclosure No. 15162 as well as Ti-pure R 931 manufactured by Du Pont Co., Ltd.

There can be used as a binder for the white reflection layer, an alkali permeable high polymer matrix, for example, gelatin, polyvinyl alcohol, and a cellulose derivative such as hydroxyethyl cellulose and carboxymethyl cellulose.

The particularly preferred binder for the white reflection layer is gelatin. The ratio of a white pigment to gelatin is 1/1 to 20/1 (ratio by weight), preferably, 5/1 to 10/1 (ratio by weight).

The anti-fading agents described in JP-B-62-30620 and JP-B-62-30621 are preferably incorporated into the white reflection layer.

D) Light shielding layer

A light shielding layer containing a light shielding agent and a hydrophilic binder is provided between the white reflection layer and a light-sensitive layer.

Any of the materials having a light shielding function can be used as the light shielding agent, and carbon black is preferably used. Also, there may be used the degradable dyes described in U.S. Pat. No. 4,615,966 and others.

Any binder can be used as a binder for coating the light shielding agent as long as it can disperse carbon black, and gelatin is preferred.

There can be used as a raw material for carbon black, the carbon black manufactured by arbitrary methods such as a channel method, a thermal method and furnace method each described in, for example, "Carbon Black" written by Donnel Voet, Marcel Dekker Inc. (1976). The grain size of carbon black is not specifically limited and is preferably 90 to 1800 Å. The addition amount of a black pigment as the light shielding agent may be adjusted according to the sensitivity of the light-sensitive material to be shielded, and it is preferably about 5 to 10 in terms of optical density.

E) Light-sensitive layer

In the present invention, a light-sensitive layer consisting of a silver halide emulsion layer combined with a dye image-forming material is provided on the above light shielding layer. The constitutional elements will be described below.

(1) Dye image-forming material

The dye image-forming material used in the present invention is a non-diffusible compound which releases a diffusible dye (which may be a dye precursor) in relation to silver development or a compound in which diffusibility of itself changes, and it is described in The Theory of Photographic Process, the fourth edition. Any of these compounds can be represented by the following Formula (I)

DYE—Y (I)

wherein DYE represents a dye or a precursor thereof; Y represents a component which provides a compound having a diffusibility different from that of the above compound under an alkaline condition. The compound represented by Formula (I) can be classified roughly to a negative type compound having a diffusibility in a silver developing area and a positive type compound having a diffusibility in a non-developing area according to the function of Y.

There can be given as specific examples of a negative type Y, those which are oxidized and split as a result of development to release a diffusible dye.

Specific examples of Y are described in U.S. Pat. Nos. 3,928,312, 3,993,638, 4,076,529, 4,152,153, 4,055,428, 4,053,312, 4,198,235, 4,179,291, 4,149,892, 3,844,785, 3,443,943, 3,751,406, 3,443,939, 3,443,940, 3,628,952, 3,980,479, 4,183,753, 4,142,891, 4,278,750, 4,139,379, 4,218,368, 3,421,964, 4,199,355, 4,199,354, 4,135,929, 4,336,322, and 4,139,389, and JP-A-53-50736, JP-A-51-104343, JP-A-54-130122, JP-A-53-110827, JP-A-56-12642, JP-A-56-16131, JP-A-57-4043, JP-A-57-650, JP-A-57-20735, JP-A-53-69033, JP-A-54-130927, JP-A-56-154342, and JP-A-57-119345.

Of Y in a negative type dye-releasing redox compound, there can be given as a particularly preferred group, an N-substituted sulfamoyl group (as the N-substituent, a group which is derived from an aromatic hydrocarbon ring or a heterocyclic ring is included). Representative examples of Y are shown below but Y is not limited only thereto.

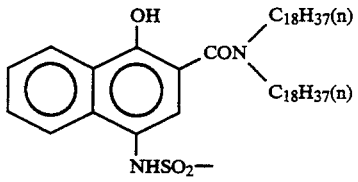

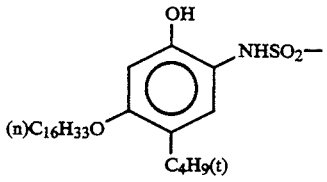

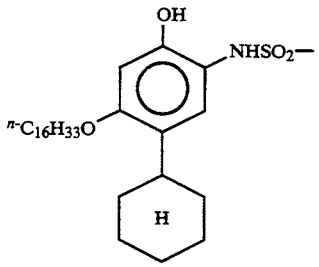

-continued

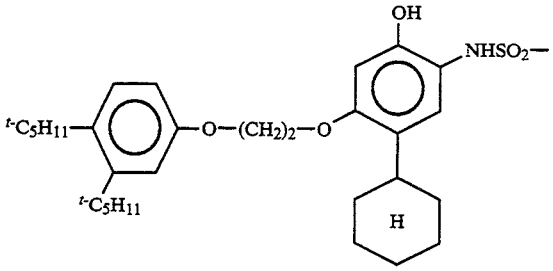

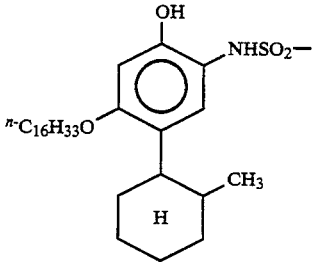

The positive type compounds are described in Angev. Chem. Inst. Ed. Engl. vol. 22, pp. 191 (1982).

There can be given as a specific example thereof, a compound (a dye developing agent) which is initially diffusible under an alkaline condition but is oxidized by development to become non-diffusible. Those which are given in U.S. Pat. No. 2,983,606 are typical as Y which is effective for the compounds of this type.

Another type is a compound which is subjected to self-ring closure under alkaline conditions to release a diffusible dye but is oxidized by development to release substantially no dye. Specific examples of Y having such a function are described in U.S. Pat. No. 3,980,479, JP-A-53-69033 and JP-A-54-130927, and U.S. Pat. Nos. 3,421,964 and 4,199,355.

Further, there is available as another type, a compound which does not release a dye by itself but releases the dye upon reduction. A compound of this type is used in combination with an electron donor and can release imagewise a diffusible dye by reaction with the remainder of the electron donor which is imagewise oxidized by silver development. The atomic groups having such function are described in, for example, U.S. Pat. Nos. 4,183,753, 4,142,891, 4,278,750, 4,139,379, 4,218,368, 4,356,249, and 4,358,525, JP-A-53-110827, JP-A-54-130927, and JP-A-56-164342, Kokai Giho 87-6199, and European Patent Publication 220746A2.

Specific examples thereof are shown below but it is not limited only thereto.

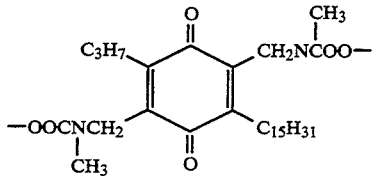

-continued

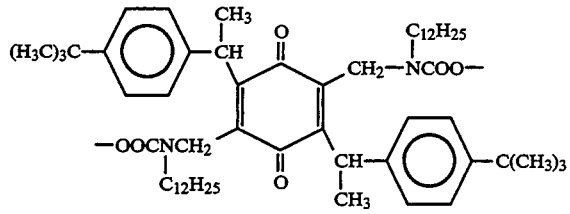

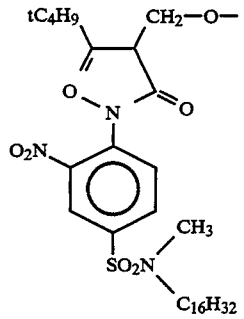

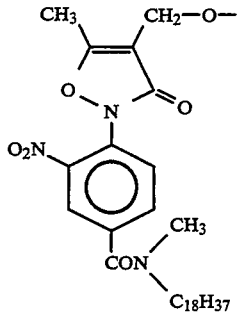

When a compound of this type is used, it is used preferably in combination with an anti-diffusion electron donor (known as an ED compound) or a precursor thereof. Examples of the ED compound are described in U.S. Pat. Nos. 4,263,393 and 4,278,750, and JP-A-56-138736.

The following compounds are examples of a dye image-forming material of another type:

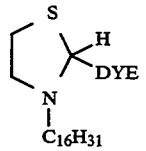

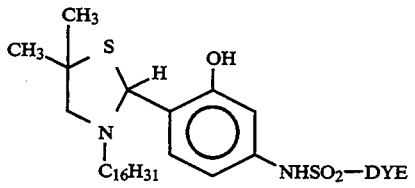

wherein DYE represents the same dye or precursor thereof as that described above.

The details thereof are described in U.S. Pat. Nos. 3,719,489 and 4,098,783.

Specific examples of the dye represented by DYE in the foregoing formula are described in the following publications:

examples of a yellow dye:

the compounds described in U.S. Pat. Nos. 3,597,200, 3,309,199, 4,013,633, 4,245,028, 4,156,609, 4,139,383, 4,195,992, 4,148,641, 4,148,643, and 4,336,322, JP-A-51-14930 and JP-A-56-71072, and Research Disclosure 17630 (1978) and 16475 (1977);

examples of a magenta dye:

the compounds described in U.S. Pat. Nos. 3,453,107, 3,544,545, 3,932,380, 3,931,144, 3,932,308, 3,954,476, 4,233,237, 4,255,509, 4,250,246, 4,142,891, 4,207,104, and 4,287,292, and JP-A-52-106727, JP-A-53-23628, JP-A-55-6804, JP-A-56-73057, JP-A-56-71060, and JP-A-55-134;

examples of a cyan dye:

the compounds described in U.S. Pat. Nos. 3,482,972, 3,929,760, 4,013,635, 4,268,625, 4,171,220, 4,242,435, 4,142,891, 4,195,994, 4,147,544, and 4,148,642, British Patent 1,551,138, JP-A-52-8827, JP-A-53-47823, JP-A-53-43323, JP-A-54-99431, and JP-A-56-71061, European Patent (EPC) 53,037 and 53,040, and Research Disclosure 17630 (1978}and 16475 (1977).

These compounds can be dispersed by the method described at pages 144 to 146 of JP-A-62-215272. Further, the compounds described at pages 137 to 144 of JP-A-62-15272 may be incorporated into these dispersions.

(2) Silver halide emulsion

The foregoing emulsion is used for the silver halide emulsion of the present invention.

(3) Constitution of the light-sensitive layer

In order to reproduce a natural color by a subtractive color process, there is used a light-sensitive layer comprising the combination of at least two components of an emulsion spectrally sensitized by the above spectral sensitizing dye and the above dye image-forming material which provides a dye having a selective spectral absorption in the same wavelength range as the emulsion spectrally sensitized. The emulsion and the dye image-forming material may be provided each in a different layer superposing one on another or both may be mixed to apply in a single layer. Where the dye image-forming material has an absorption in a spectral sensitivity region of the emulsion combined therewith when it is coated, both are preferably provided each in a different layer. Also, the emulsion layer may consist of plural emulsion layers each having a different sensitivity, or an arbitrary layer may be provided between the emulsion layer and dye image-forming material layer. There can be provided, for example, a layer containing a nucleus-forming development accelerator, described in JP-A-60-173541, and a partition wall layer described in JP-B-60-15267 to increase the dye image density, and a reflection layer can be provided as well to raise the sensitivity of a light-sensitive element.

The reflection layer is a layer containing a white pigment and a hydrophilic binder. The white pigment is preferably titanium oxide and the hydrophilic binder is preferably gelatin. The coated amount of titanium oxide is 0.1 to 8 g/m$^2$, preferably 0.2 to 4 g/m$^2$. An example of the reflection layer, which is the preferred embodiment of the present invention, is described in JP-A-60-91354.

In a preferred multilayer constitution, there are provided in order from an exposure side, a combination unit of a blue-sensitive emulsion, a combination unit of a green-sensitive emulsion, and a combination unit of a red-sensitive emulsion.

An arbitrary layer can be provided between the respective emulsion layer units according to necessity. In particular, an intermediate layer is preferably provided in order to prevent an unfavorable affection wherein an effect by development in one layer is exerted on other emulsion layer units.

Where a developing agent is used in combination with a non-diffusible dye image-forming material, an intermediate layer preferably contains a non-diffusible reducing agent in order to prevent the diffusion of an oxidation product of the developing agent. To be specific, there can be given non-diffusible hydroquinone, sulfonamidephenol, and sulfonamidenaphthol. To be further specific, useful non-diffusible reducing agents are described in JP-B-50-21249 and JP-B-50-23813, JP-A-49-106329 and JP-A-49-129535, U.S. Pat. Nos. 2,363,327, 2,360,290, 2,403,721, 2,544,640, 2,732,300, 2,782,659, 2,937,086, 3,637,393, and 3,700,453, British Patent 557,750, and JP-A-57-24941 and JP-A-58-21249. The methods for dispersing them are described in JP-A-60-238831 and JP-B-60-18978.

Where a compound releasing a diffusible dye by a silver ion is used as described in JP-B-55-7576, a compound capturing the silver ion is preferably incorporated into an intermediate layer.

In the present invention, an anti-irradiation layer, a UV absorbing layer and a protective layer are provided according to necessity.

F) Peeling layer

In the present invention, a peeling layer can be provided according to necessity in order to peel off at an arbitrary portion of a light-sensitive sheet in a unit after processing. Accordingly, this peeling layer has to be readily peeled off after processing. There can be used as the material for the peeling layer, the compounds described in, for example, JP-A-47-8237, JP-A-59-220727, JP-A-59-229555, and JP-A-49-4653, U.S. Pat. Nos. 3,220,835 and 4,359,518, JP-A-49-4334, JP-A-56-65133, and JP-A-45-24075, and U.S. Pat. Nos. 3,227,550, 2,759,825, 4,401,746, and 4,366,227. A water soluble (or alkali soluble) cellulose derivative can be given as one specific example thereof. There are available, for example, hydroxyethyl cellulose, cellulose acetate phthalate, plasticized methyl cellulose, ethyl cellulose, cellulose nitrate, and carboxy-methyl cellulose. There are available as another example, various natural high polymers, for example, alginic acid, pectin, and gum arabic. There can be used various modified gelatin as well, for example, acetylized gelatin and phthalized gelatin. Further, a water soluble synthetic polymer can be given as another example. There are available, for example, polyvinyl alcohol, polyacrylate, polymethyl methacrylate, polybutyl methacrylate, and a copolymer thereof.

The peeling layer may consist of a single layer or plural layers as described in, for example, JP-A-59-220727 and JP-A-60-60642.

II. Cover sheet

In the present invention, in order to evenly spread a processing solution on a light-sensitive element and neutralize alkali after processing to stabilize an image, there is used a transparent cover sheet having a layer (a neutralization layer and a neutralization timing layer) having a neutralizing function, and a dye-capturing layer according to the present invention is provided on the outermost layer at a side where the processing solution of the cover sheet is spread.

G) Support

Any type of support can be used as a support for the cover sheet used in the present invention as long as it is a flat and transparent support usually used for a photographic light-sensitive layer. There can be used cellulose acetate, polystyrene, polyethylene terephthalate, and polycarbonate, and a subbing layer is preferably provided.

A trace amount of a dye is preferably incorporated into the support in order to prevent a light piping.

H) Layer having a neutralizing function

The layer having a neutralizing function used in the present invention is a layer containing a sufficient amount of an acid material for neutralizing alkali carried over from a processing composition, and it may also be of a multilayer constitution comprising a neutralizing speed controlling layer (a timing layer) and an adhesiveness strengthening layer according to necessity. The preferred acid material is a material containing an acid group having a pKa of 9 or less (or a precursor group giving such an acid group by hydrolysis). There can be given more preferably higher fatty acids such as oleic acid, as disclosed in U.S. Pat. No. 2,983,606, and a polymer of acrylic acid, methacrylic acid or maleic acid, and a partially esterified or acid anhydride polymer thereof, as disclosed in U.S. Pat. No. 3,362,819; a copolymer of acrylic acid and an acrylic acid ester, as disclosed in French Patent 2,290,699; and latex type acid polymers, as disclosed in U.S. Pat. No. 4,139,383 and Research Disclosure No. 16102 (1977).

In addition to the above, there can also be used the acid materials disclosed in U.S. Pat. No. 4,088,493, and JP-A-52-153739, JP-A-53-1023, JP-A-53-4540, JP-A-53-4541, and JP-A-53-4542.

Specific examples of the acid polymer are a copolymer of a vinyl monomer such as ethylene, vinyl acetate and vinyl methyl ether and maleic acid anhydride, and an n-butyl ester thereof, and a copolymer of butyl acrylate and acrylic acid.

The above polymer acids can be mixed with a hydrophilic polymer. Such polymers are polyacrylamide, polymethyl pyrrolidone, polyvinyl alcohol (including a partially saponified polymer), carboxymethyl cellulose, hydroxymethyl cellulose, hydroxyethyl cellulose, and polymethylvinyl ether. Of them, polyvinyl alcohol is preferred.

A polymer other than a hydrophilic polymer, for example, cellulose acetate may be mixed in the above polymer acid.

The coated amount of the polymer acid is regulated by the amount of alkali spread in the light-sensitive element. An equivalent ratio per unit area of the polymer acid to alkali is preferably 0.9 to 2.0. Too small an amount of the polymer acid changes the hue of a transferred dye and causes stain on a white background. Meanwhile, an excessive amount thereof causes inconveniences such as a change of hue and a reduction of durability to light. A more preferable equivalent ratio is 1.0 to 1.3. An excessive or too small amount of a hydrophilic polymer to be mixed deteriorates as well the quality of a photograph. A weight ratio of the hydrophilic polymer to the polymer acid is 0.1 to 10, preferably 0.3 to 3.0.

In the present invention, the additives can be incorporated into the layer having a neutralizing function for the various purposes. For example, there can be added a hardener which is known to the person of ordinary skill in the art for the purpose of hardening, and a polyhydric hydroxyl compound such as polyethylene glycol, polypropylene glycol, and glycerine in order to improve the fragility of the layer. In addition to the above, there also can be added according to necessity, an anti-oxidation agent, a fluorescent whitening agent, and a development inhibitor and a precursor thereof.

Useful for a timing layer which is used in combination with a neutralizing layer are, for example, a polymer which lowers alkali permeability, such as gelatin, polyvinyl alcohol, partially acetalized polyvinyl alcohol, cellulose acetate, and partially hydrolyzed polyvinyl acetate; a latex polymer which is prepared by copolymerizing a small amount of a hydrophilic comonomer such as an acrylic acid monomer and which increases the activation energy for an alkali permeation; and a polymer having a lactone ring.

Above all, particularly useful are a timing layer in which cellulose acetate is used, disclosed in JP-A-54-136328, and U.S. Pat. Nos. 4,267,262, 4,009,030, and 4,029,849; a latex polymer prepared by copolymerizing a small amount of a hydrophilic comonomer such as acrylic acid, disclosed in JP-A-54-128335, JP-A-56-69629, and JP-A-57-6843, and U.S. Pat. Nos. 4,056,394, 4,061,496, 4,199,362, 4,250,243, 4,256,827, and 4,268,604; a polymer having a lactone ring, disclosed in U.S. Pat. No. 4,229,516; and in addition, the polymers disclosed in JP-A-56-25735, JP-A-56-97349, and JP-A-57-6842, and European Patent (EP) 31,957Al, 37,724Al, and 48,412Al.

In addition to the above compounds, those described in the following publications can be used as well: U.S Pat. Nos. 3,421,893, 3,455,686, 3,575,701, 3,778,265, 3,785,815, 3,847,615, 4,088,493, 4,123,275, 4,148,653, 4,201,587, 4,288,523, and 4,297,431, German Patents (OLS) 1,622,936 and 2,162,277, and Research Disclosure 15,162 No. 151 (1976).

The timing layer in which these materials are used may be used as a single layer or a combination of two or more layers.

It is possible to incorporate into the timing layer comprising these materials, for example, the development inhibitors and/or precursors thereof, disclosed in U.S. Pat. Nos. 4,009,029, German Patents (OLS) 2,913,164 and 3,014,672, and JP-A-54-155837 and JP-A-55-138745; a hydroquinone precursor disclosed in U.S. Pat. Nos. 4,201,578; and other photographically useful additives or precursors thereof.

Further, an auxiliary neutralizing layer can be provided as a neutralizing layer as described in JP-A-63-168468 and JP-A-63-168649, which is effective in terms of lowering a change of the transfer density attributable to aging after processing.

I) Others

In addition to the layer having a neutralizing function, there may be provided a back layer, a protective layer, a capturing mordant layer, and a filter dye layer as a layer having an auxiliary function.

The back layer is provided in order to adjust curling and to give lubrication. A filter dye may be added to this layer.

The protective layer is used mainly for the purpose of preventing adhesion with a cover sheet back side and adhesion with a protective layer of a light-sensitive material when the light-sensitive material and cover sheet are superposed.

In the capturing mordant layer, a dye which is diffused to an alkali processing composition side can be captured to prevent a delay of a dye image formation time and deterioration of sharpness. A dye capturing layer is usually provided on the outermost layer of the cover sheet. The dye capturing layer contains a polymer mordant in gelatin as well as the above dye receiving layer and is described in JP-A-1-198747 and JP-A-2-282253.

A dye can be incorporated into a cover sheet to control the sensitivity of a light-sensitive layer. A filter dye may be added directly to a support of a cover sheet, a layer having a neutralizing function, and further the above back layer, protective layer and capturing mordant layer, or an independent layer containing it may be provided.

III. Alkali processing composition

The processing composition used in the present invention is uniformly spread on a light-sensitive element after the light-sensitive element is exposed, and paired with a light shielding layer provided on a back side of a support or a side opposite to a processing solution on a light-sensitive layer to completely shield the light-sensitive layer from light coming from the outside. In addition, the processing composition develops the light-sensitive layer with the components contained therein. For this purpose, there are contained in the composition, alkali, a thickener, a light shielding agent, a developing agent, further, a developing accelerator and developing inhibitor each used for adjusting the development, and an anti-oxidation agent used for preventing the developing agent from deteriorating. The light shielding agent is always present in the composition.

The alkali may be enough for adjusting the pH to 12 to 14 and there can be used hydroxides of alkali metals (for example, sodium hydroxide, potassium hydroxide and lithium hydroxide), phosphates of alkali metals (for example, potassium phosphate), guanidines, and hydroxides of quaternary amines (for example, tetramethylammonium hydroxide). Of them, potassium hydroxide and sodium hydroxide are preferred.

The thickener is necessary for uniformly spreading the processing solution and maintaining adhesiveness between the light-sensitive layer and the cover sheet. There is used, for example, polyvinyl alcohol, hydroxyethyl cellulose and a metal salt of carboxyethyl cellulose. Hydroxyethyl cellulose and sodium carboxyethyl cellulose are preferably used.

There can be used as the light shielding agent, either a dye or pigment, or a combination thereof as long as it is not diffused to a dye image-receiving layer to generate a stain. Carbon black can be given as a typical example.

Any developing agent can be used as a preferred developing agent as long as it is subjected to cross oxidation with a dye image-forming material and does not substantially generate a stain by oxidation. The developing agent may be used alone or in combinations of two or more or in the form of a precursor.

These developing agents may be present in a suitable layer of the light-sensitive element or in an alkaline processing solution. There can be given as specific examples, aminophenols and pyrazolidinones. Of them, pyrazolidinones are particularly preferred because of less stain generation.

There can be used, for example, 1-phenyl-3-pyrazolidinone, 1-p-tolyl-4,4-dihydroxymethyl-3-pyrazolidinone, 1-(3'-methylphenyl)-4-methyl-4-hydroxymethyl-3-pyrazolidinone, 1-phenyl-4-hydroxymethyl-3pyrazolidinone, and 1-p-tolyl-4-methyl-4-hydroxymethyl-3-pyrazolidinone.

There can be included in either of a light-sensitive sheet, a cover sheet and an alkali processing composition, the development accelerators described at pages 72 to 91, the hardeners described at pages 146 to 155, the surface active agents described at pages 201 to 210, the fluorine-containing compounds described at pages 210 to 222, the thickeners described at pages 225 to 227, the anti-static agents described at pages 227 to 230, the polymer latexes described at pages 230 to 239, and the matting agents described at page 240 each in JP-A-62-215272.

EXAMPLE

The present invention will be explained below with reference to specific examples but the present invention is not limited thereto.

First, the preparation method of a silver halide emulsion will be explained.

a. Preparation of a tabular core emulsion grain

An $AgNO_3$ aqueous solution of 1.17 M/liter containing gelatin and a KBr aqueous solution of 1.17 M/liter containing gelatin were simultaneously added to a 0.7 weight % gelatin aqueous solution (1200 ml) containing KBr of 0.046 M [gelatin is alkali-treated gelatin having an average molecular weight (average M) of 20,000] at an addition speed of 53 ml/minute for 66 seconds while stirring at 30° C. Then, a gelatin aqueous solution (170 ml) (a 20 weight % solution of deionized alkali-treated gelatin) was added and the temperature was raised to 75° C. After raising the temperature, the solution was ripened for 12 minutes and then a 1.06M $AgNO_3$ aqueous solution (27 ml) was added, followed by adding aqueous $NH_3$ (25% by weight) and ripening the solution for 20 minutes. Next, after neutralizing ammonia with an $HNO_3$ aqueous solution, a 1.06M $AgNO_3$ aqueous solution and a 1.2 M KBr aqueous solution were added by a double jet method at an accelerated flow speed (the flow speed in finishing the addition was four times as large as that in starting the addition) while maintaining pBr at 1.47. The amount of the AgNO: aqueous solution used was 500 ml. This emulsion was washed with a conventional flocculation method and gelatin was added for dispersion, whereby a core emulsion of 800 g was obtained. The hexagonal tabular grains thus obtained had an average projected area-corresponding circle diameter of 1.0 μm, an average thickness of 0.19 μm, and a coefficient of variation of 12% in grain size distribution, and 99% or more of the projected area of all of the silver halide grains was shared by the hexagonal tabular grains.

b. Preparation of a fine grain emulsion

Fine grain emulsion-1 (non-twin crystal grain emulsion)

A gelatin aqueous solution (containing $H_2O$ 3,600 ml, deionized alkali-treated gelatin 72 g having an average molecular weight of 20,000, and KBr 1.08 g) was put in a mixing vessel and an $AgNO_3$ aqueous solution (containing $AgNO_3$ 32 g, deionized alkali-treated gelatin 1 g having an average molecular weight of 20,000, and 1N $HNO_3$ 0.24 ml each per 100 ml) and a KBr aqueous solution (containing KBr 22.45 g and deionized alkali-treated gelatin 1 g having an average molecular weight of 20,000 each per 100 ml) were added at an addition speed of 300 ml/minute for 4 minutes while maintaining the temperature at 25° C. and stirring. After stirring for 2 minutes more, the stirring was stopped. The emulsion grains thus obtained had an average grain size of 0.033 μm. A part of the grains was taken out and grown at 30° C. and a pBr of 1.5 using an $AgNO_3$ aqueous solution and a KBr aqueous solution without generating a new nucleus. A photographic image (TEM image) of a replica of the grains thus obtained, taken with a transmission type electron microscope, was observed to find that the ratio of a non-twin crystal grain number was 99.9% or more.

Fine grain emulsion-2 (twin crystal-containing fine grain emulsion

A fine grain emulsion was prepared in the same manner as the fine grain emulsion-1 except that the gelatin used was replaced with deionized alkali-treated gelatin having an average molecular weight of 100,000, that the amount of gelatin contained in the mixing vessel was changed to 35 g and that the temperature in the mixing vessel was maintained at 40° C. The emulsion grains thus obtained had an average grain size of 0.05 μm. A part of the fine grains was taken out to confirm in the same manner as the fine grain emulsion-1 that 7% of the whole grains was shared by the twin crystal-containing grains.

c. Preparation of a core/shell emulsion c-1. Preparation of a core/shell emulsion-1 (comparative example)

Water (750 ml) and gelatin (30 g) were added to the above core emulsion (250 g) and the temperature was raised to 75° C. Then, there were added thereto, a KBr aqueous solution (10% by weight), 1,8-dihydroxy-3,6-dithioctane (0.5 g), sodium thiosulfate (0.8 mg) and potassium chloraurate (0.4 mg) (each was added in the form of an aqueous solution), and the emulsion was heated at 70° C. for 70 minutes to subject it to a chemical sensitization treatment. Next, an $AgNO_3$ aqueous solution (a 20 weight % solution) and a KBr aqueous solution (a 17 weight % solution) were added by a linear flow rate accelerating adding method (the final addition flow rate was four times as large as the initial addition flow rate) and the pBr was adjusted to 1.56 to thereby carry out a shell formation. The addition amount of the $AgNO_3$ aqueous solution was 510 ml. The emulsion was washed by a conventional flocculation method and a dispersant was added for dispersion. Then, sodium thiosulfate (0.45 mg) and poly(N-vinylpyrrolidone) (15 mg) each per mole of silver were added to the emulsion and the emulsion was heated at 60° C. for 60 minutes to thereby subject the surface of the grains to a chemical sensitization. The grains thus obtained had an average projected area-corresponding circle diameter of 1.5 μm, an average thickness of 0.44 μm, and a coefficient of variation of 20% in grain size distribution.

c-2. Preparation of a core/shell emulsion-2 (comparative example)

The core/shell emulsion-2 was prepared in the same manner as the core/shell emulsion-1 except that the pBr during the shell formation was adjusted to 2.13. The hexagonal tabular grains thus obtained had an average projected area-corresponding circle diameter of 1.2 μm, an average thickness of 0.71 μm, and a coefficient of variation of 18% in grain size distribution.

c-3. Preparation of a core/shell emulsion-3 (invention)

The core/shell emulsion-3 was prepared in the same manner as the core/shell emulsion-1 up to chemical sensitization and after the pBr was adjusted to 1.56, the above fine grain emulsion-1 (non-twin crystal fine grain emulsion) was added four times every 7 minutes at 400 ml. Further, the emulsion was ripened for 10 minutes to thereby carry out a shell formation. The emulsion was subjected to washing, dispersing and a chemical sensitization on a surface of a grain in the same manner as the core/shell emulsion-1, whereby the core/shell emulsion-3 was prepared. The hexagonal tabular grains thus obtained had an average projected area-corresponding circle diameter of 2.01 μm, an average thickness of 0.25 μm, and a coefficient of variation of 16% in grain size distribution.

c-4. Preparation of a core/shell emulsion-4 (invention)

The core/shell emulsion-4 was prepared in the same manner as the core/shell emulsion-3 except that the pBr in the shell formation was adjusted to 2.5 and that the ripening time after adding the fine grains was set at 30 minutes. The hexagonal tabular grains thus obtained had an average projected area-corresponding circle diameter of 1.80 μm, an average thickness of 0.31 μm, and a coefficient of variation of 13% in grain size distribution.

c-5. Preparation of a core/shell emulsion-5 (comparative example)

The core/shell emulsion-5 was prepared in the same manner as the core/shell emulsion-3 except that the fine grains used were changed to the fine grain emulsion-2 (a twin crystal-containing fine grain emulsion). The hexagonal tabular grains thus obtained had an average projected area-corresponding circle diameter of 1.90 μm, an average thickness of 0.28 μm, and a coefficient of variation of 30% in size distribution.

The above core/shell emulsion-1 was used to prepare a comparative light-sensitive element 101 having the constitution shown below.

| | Coated amount (g/m²) | |
|---|---|---|
| Twenty first layer: a protective layer | | |
| Gelatin | | 1.00 |
| Matting agent (1) | | 0.25 |
| Twentieth layer: a UV absorbing layer | | |
| Gelatin | | 0.50 |
| UV absorber (1) | | $4.0 \times 10^{-4}$ |
| UV absorber (2) | | $4.0 \times 10^{-4}$ |
| Nineteenth layer: a yellow-sensitive layer (high sensitivity) | | |
| Inner latent type direct positive core/shell emulsion (core/shell emulsion-1) | converted to silver | 0.60 |
| Sensitizing dye (3) | | $1.4 \times 10^{-3}$ |
| Nucleus-forming agent (1) | | $6.8 \times 10^{-8}$ |
| Additive (2) | | 0.03 |
| Gelatin | | 0.70 |

-continued

| | Coated amount (g/m²) | |
|---|---|---|
| Eighteenth layer: a yellow-sensitive layer (low sensitivity) | | |
| Inner latent type direct positive emulsion (grain size: 1.1 μm, octahedron) | converted to silver | 0.25 |
| Sensitizing dye (3) | | $9.0 \times 10^{-4}$ |
| Nucleus-forming agent (1) | | $8.0 \times 10^{-8}$ |
| Additive (2) | | $4.5 \times 10^{-2}$ |
| Gelatin | | 0.40 |
| Seventeenth layer: a white reflection layer | | |
| Titanium dioxide | | 0.70 |
| Gelatin | | 0.18 |
| Sixteenth layer: a yellow color material layer | | |
| Yellow dye-releasing compound (1) | | 0.53 |
| High boiling organic solvent (1) | | 0.13 |
| Additive (1) | | $1.4 \times 10^{-2}$ |
| Gelatin | | 0.70 |
| Fifteenth layer: an intermediate layer | | |
| Gelatin | | 0.30 |
| Fourteenth layer: an anti-color mixing layer | | |
| Additive (1) | | 0.80 |
| Polymethyl methacrylate | | 0.80 |
| Gelatin | | 0.45 |
| Thirteenth layer: a green-sensitive layer (high sensitivity) | | |
| Inner latent type direct positive core/shell emulsion (core/shell emulsion-1) | converted to silver | 0.80 |
| Sensitizing dye (2) | | $2.1 \times 10^{-3}$ |
| Nucleus forming agent (1) | | $2.5 \times 10^{-8}$ |
| Additive (2) | | 0.08 |
| Gelatin | | 1.00 |
| Twelfth layer: a green-sensitive layer (low sensitivity) | | |
| Inner latent type direct positive core/shell emulsion (grain size: 1.0 μm, octahedron) | converted to silver | 0.25 |
| Sensitizing dye (2) | | $1.1 \times 10^{-3}$ |
| Nucleus-forming agent (1) | | $4.4 \times 10^{-8}$ |
| Additive (2) | | 0.03 |
| Gelatin | | 0.50 |
| Eleventh layer: a white reflection layer | | |
| Titanium dioxide | | 1.00 |
| Gelatin | | 0.25 |
| Tenth layer: a magenta color material layer | | |
| Magenta dye-releasing compound (1) | | 0.50 |
| High boiling organic solvent (1) | | 0.10 |
| Additive (1) | | $9.0 \times 10^{-3}$ |
| Gelatin | | 0.90 |
| Ninth layer: an intermediate layer | | |
| Gelatin | | 0.30 |
| Eighth layer: an anti-color mixing layer | | |
| Additive (1) | | 1.20 |
| Polymethyl methacrylate | | 1.20 |
| Gelatin | | 0.70 |
| Seventh layer: a red-sensitive layer (high sensitivity) | | |

-continued

| | Coated amount ($g/m^2$) |
|---|---|
| Inner latent type direct positive core/shell emulsion (core/shell emulsion-1) | converted to silver 0.50 |
| Sensitizing dye (1) | $6.2 \times 10^{-4}$ |
| Nucleus-forming agent (1) | $5.0 \times 10^{-8}$ |
| Additive (2) | 0.04 |
| Gelatin | 0.80 |
| Sixth layer: a red-sensitive layer (low sensitivity) | |
| Inner latent type direct positive emulsion (grain size: 1.0 μm, octahedron) | converted to silver 0.15 |
| Sensitizing dye (1) | $3.0 \times 10^{-4}$ |
| Nucleus-forming agent (1) | $5.0 \times 10^{-8}$ |
| Additive (2) | 0.02 |
| Gelatin | 0.40 |
| Fifth layer: a white reflection layer | |
| Titanium dioxide | 3.00 |
| Gelatin | 0.80 |
| Fourth layer: a cyan color material layer | |
| Cyan dye-releasing compound (1) | 0.50 |
| High boiling organic solvent (1) | 0.10 |
| Additive (1) | 0.01 |
| Gelatin | 1.00 |
| Third layer: an opaque layer | |

-continued

| | Coated amount ($g/m^2$) |
|---|---|
| Carbon black | 1.70 |
| Gelatin | 1.70 |
| Second layer: a white reflection layer | |
| Titanium dioxide | 22.00 |
| Gelatin | 2.75 |
| First layer: an image-receiving layer | |
| Polymer mordant (1) | 3.00 |
| Gelatin | 3.00 |
| Support | (polyethylene terephthalate having a thickness of 150 μm) |

Next, the emulsion contained in the seventh layer was replaced with the core/shell emulsions-2 to 5 as shown in Table 1 and the amount of the sensitizing dye used was changed as shown in Table 1 to prepare Light-sensitive elements 102 to 105.

TABLE 1

| Light-sensitive element No. | Seventh layer | |
|---|---|---|
| | Emulsion No. | Sensitizing dye |
| 102 (Comp.) | core/shell emulsion-2 | $3.7 \times 10^{-4}$ $g/m^2$ |
| 103 (Inv.) | core/shell emulsion-3 | $1.1 \times 10^{-3}$ $g/m^2$ |
| 104 (Inv.) | core/shell emulsion-4 | $8.7 \times 10^{-4}$ $g/m^2$ |
| 105 (Comp.) | core/shell emulsion-5 | $9.4 \times 10^{-4}$ $g/m^2$ |

The structures of the compounds used are shown below:

Polymer mordant (1)

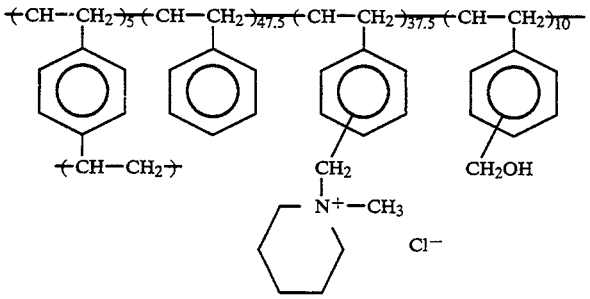

UV absorber (1)

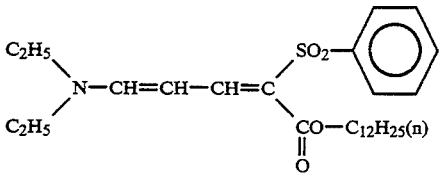

UV absorber (2)

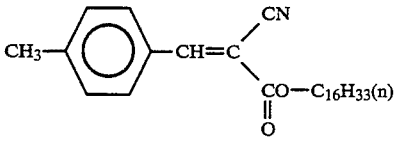

Matting agent (1)

Polymethyl methacrylate spherical latex (an average grain size: 4μm)

Cyan dye-releasing compound (1)

-continued
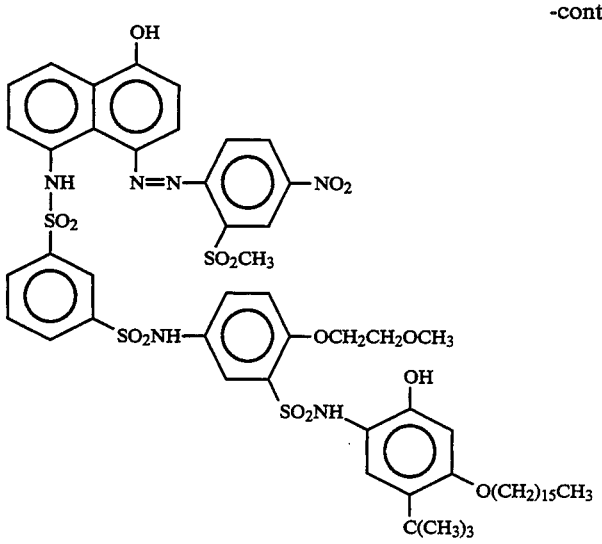
Magenta dye-releasing compound (1)
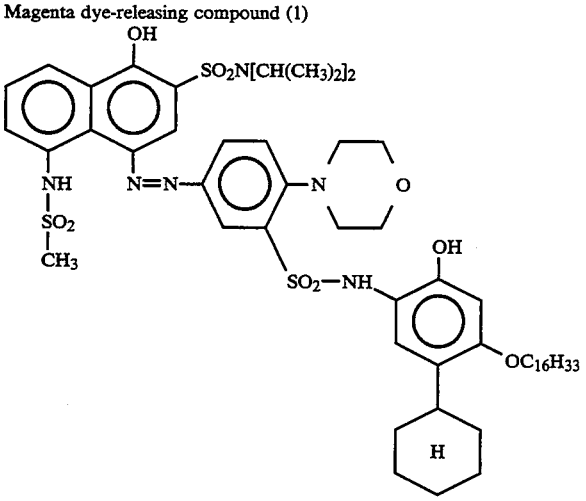
Yellow dye-releasing compound (1)
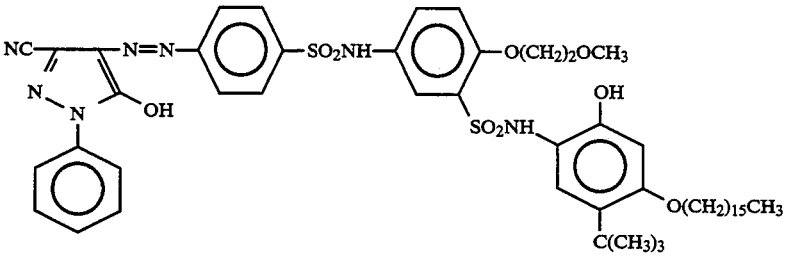
Additive (1)
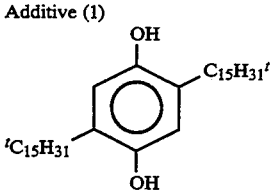
Additive (2)
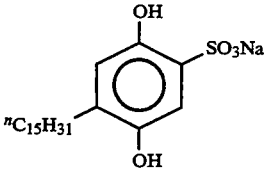

-continued

High boiling organic solvent (1)
Tricyclohexyl phosphate

Nucleus-forming agent (1)

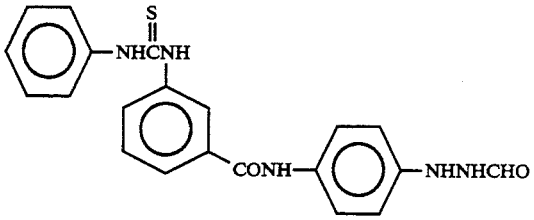

Sensitizing dye (1)

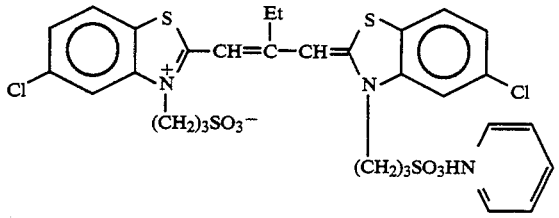

Sensitizing dye (2)

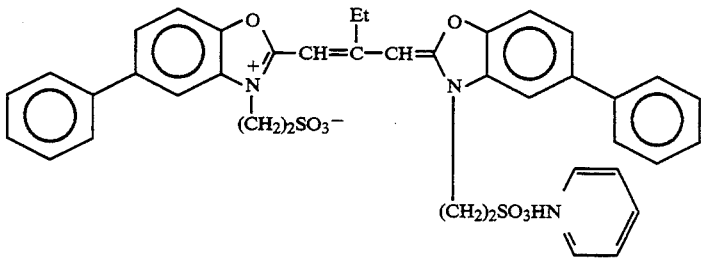

Sensitizing dye (3)

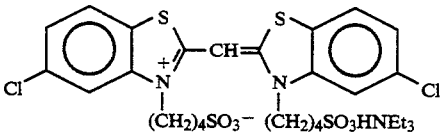

The cover sheet was prepared in the following manner.

The following layers were applied on a gelatin subbed polyethylene terephthalate transparent support containing an anti-light piping dye:

(1) a neutralization layer containing an acrylic acid-butyl acrylate (mole ratio: 8:2) copolymer having an average molecular weight of 50,000 (10.4 g/m$^2$) and 1,4-bis(2,3-epoxypropoxy)-butane (0.1 g/m$^2$);

(2) a neutralization timing layer containing acetyl cellulose with an acetylation degree of 51% (4.3 g/m$^2$) and poly(methylvinyl ether-co-monomethyl maleate) (0.2 g/m$^2$);

(3) a layer containing a polymer latex prepared by emulsion-polymerizing styrene, butyl acrylate, acrylic acid and N-methylol acrylamide at a weight ratio of 49.7:42.3:4:4 and a polymer latex prepared by emulsion-polymerizing methyl methacrylate, acrylic acid and N-methylol acrylamide at a weight ratio of 93:3:4, wherein the above latexes were blended so that the solid matter ratio thereof was 6:4 and the blended latex was coated so that the coated solid matter was 2.5 g/m$^2$; and (4) a layer containing gelatin of 1 g/m$^2$.

The composition of the alkali treatment composition is shown below:

| | |
|---|---|
| 1-p-Tolyl-4-hydroxymethyl-4-methyl-3-pyrazolidone | 10.0 g |
| Methylhydroquinone | 0.18 g |
| 5-Methylbenzotriazole | 3.0 g |
| Anhydrous sodium sulfite | 0.2 g |
| Benzyl alcohol | 1.5 ml |
| Sodium carboxymethyl cellulose | 58 g |
| Carbon black | 150 g |
| Potassium hydroxide (28% aqueous solution) | 200 ml |
| Water | 680 ml |

The processing solution having the above composition was charged by each 0.8 g in a vessel which can be broken by pressure.

After each of the light-sensitive elements 101 to 105 was exposed from the emulsion layer side through a grey filter, it was superposed on the above cover sheet and the above processing solution was spread therebetween by means of a pressurized roller so that the thickness thereof was 75 μm. The processing was carried out at 25° C., and 10 minutes later, the transferred density was measured with a color densitometer. The results thereof are shown in Table 2.

TABLE 2

| Light-sensitive element No. | Relative sensitivity* (cyan) | Minimum density (cyan) |
|---|---|---|
| 101 (Comp.) | 100 | 0.35 |
| 102 (Comp.) | 85 | 0.34 |
| 103 (Inv.) | 135 | 0.33 |
| 104 (Inv.) | 110 | 0.32 |
| 105 (Comp.) | 120 | 0.41 |

*Relative sensitivity is represented by the relative value (a real number) based on the sensitivity of Sample 101 at the density of 1.0 as standardized to be 100.

It can be found from the above results that where the shell formation is carried out with an $AgNO_3$ aqueous solution and a KBr aqueous solution, the shell formation carried out at a higher pBr lowers the aspect ratio while uniformity in the shell formation shows a tendency toward improvement and meanwhile that the shell formation carried out at a lower pBr makes itself uneven while a high aspect ratio can be obtained. Either of the above results is unsatisfactory.

Further, it has been found that where the shell formation is carried out with the twin crystal-containing fine grains, the minimum density unsatisfactorily becomes high while an emulsion with a high aspect ratio can be obtained.

On the contrary, there can be obtained according to the present invention, a color diffusion transfer light-sensitive material in which a high aspect ratio is compatible with uniformity of shell formation and high sensitivity and low minimum density can be achieved. It has been confirmed that the effects of the present invention are notable in carrying out the shell formation at low pBr.

While the invention has been described in detail and with reference to specific embodiments thereof, it will be apparent to one skilled in the art that various changes and modifications can be made therein without departing from the spirit and scope thereof.

What is claimed is:

1. A color diffusion transfer photographic film unit comprising:

1) a light-sensitive sheet comprising a transparent support, an image receiving layer, a white reflection layer, a light shielding layer, and at least one silver halide emulsion layer combined with at least one dye image-forming material, 2) a transparent cover sheet comprising at least a neutralization layer and a neutralization timing layer on a transparent support, and 3) a light-shielding alkali treating-composition spread between the above light-sensitive sheet and transparent cover sheet, wherein one or more of the at least one silver halide emulsion layers comprises a direct positive silver halide emulsion containing a core/shell type grain in which 60% or more of the projected area of all grains is shared by monodispersed parallel twin crystal-containing type tabular grains having an aspect ratio of 1.5 or more and two or three twinning planes, wherein the shell of the core/shell grain is formed by adding a silver salt in which at least 30 mole % or more of the silver salt is a non-twin crystal silver halide fine grain emulsion having an average grain size of 0.12 μm or less.

2. A direct positive silver halide emulsion containing a core/shell type grain in which 60% or more of the projected area of all grains is shared by monodispersed parallel twin crystal-containing type tabular grains having an aspect ratio of 1.5 or more and two or three twinning planes, wherein the shell of the core/shell grain is formed by adding a silver salt in which at least 30 mole % of the silver salt is a non-twin crystal silver halide fine grain emulsion having an average grain size of 0.12 μm or less.

3. The direct positive silver halide emulsion of claim 2, wherein the non-twin crystal silver halide fine grain emulsion has an average grain size of from 0.1 to 0.01 μm.

4. The direct positive silver halide emulsion of claim 2, wherein the mole ratio of the core portion/the shell portion in the tabular grain is from 1/30 to 5/1.

5. The direct positive silver halide emulsion of claim 2, wherein the aspect ratio of the tabular grain is from 3 to 20.

6. The direct positive silver halide emulsion of claim 2, wherein the coefficient of variation of the grain size in the tabular grain is 35% or less.

7. The direct positive silver halide emulsion of claim 2, wherein 95% or more of the projected area of all silver halide grains is shared by the tabular grains.

8. The direct positive silver halide emulsion of claim 2, wherein the shell is formed at a pBr of 2.7 or less.

9. The direct positive silver halide emulsion of claim 8, wherein the shell is formed at a pBr of from 2 to 0.4.

10. The direct positive silver halide emulsion of claim 9, wherein the shell is formed at a pBr of from 1.5 to 0.6.

11. The direct positive silver halide emulsion of claim 10, wherein the shell is formed at a pBr of from 1.5 to 0.6 and then grain growth is continued at a pBr of from 2 to 4.

* * * * *